Patented Sept. 10, 1940

2,214,454

UNITED STATES PATENT OFFICE 2,214,454

MANUFACTURE OF FINELY DIVIDED PHTHALOCYANINE PIGMENTS

Charles Enrique Dent, London, England, assignor to Imperial Chemical Industries Limited, a corporation of Great Britain No Drawing. Application December 9, 1937, Serial No. 178,907. In Great Britain December 11, 1936

4 Claims. (Cl. 260—314)

In British Specification No. 410,814 it is described how a sodium-containing phthalocyanine is obtained by the interaction of phthalonitrile and sodium amyloxide dissolved in amyl alcohol. It is also said that potassium may be used instead of sodium and cyclohexanol instead of amyl alcohol, and that sodium ethoxide may be used instead of sodium amyloxide. It is also said that what appears to be a compound now to be called a tetrabenzphthalocyanine is obtained from the reaction product obtained by treating 1:2-dicyano-naphthalene with sodium amyloxide in amyl alcohol.

It is now known that the processes thus briefly described are to be described in detail as two stage reactions, that is, the processes described are to be represented as follows (phthalonitrile being used for illustration as typical of the group of aromatic 1:2-dinitriles that may be used):

(i) $4C_6H_4(CN_2) + 2Na = (C_6H_4C_2N_2)_4Na_2$
(ii) $(C_6H_4C_2N_2)_4Na_2 + H_2 = (C_6H_4C_2N_2)_4H_2 + 2Na$

Stage ii takes place either during the treatment with alcohol or with sulphuric acid (dissolution and reprecipitation) as described.

The compound $(C_6H_4C_2N_2)_4Na_2$ is typical of a group to be called the alkali metal phthalocyanines.

Now, when the replacement of, for instance, sodium by hydrogen takes place in the process of dissolving the substance in concentrated sulphuric acid and adding water to reprecipitate, or when an already-made "metal-free" phthalocyanine is so treated, there is obtained a "metal-free" phthalocyanine in a finely divided form which which is suitable for use as a pigment. But this method of producing a suitably finely divided substance has disadvantages: the manipulation is unpleasant and there tends to be waste of sulphuric acid.

The present invention relates to an improvement in the manufacture of finely divided metal-free phthalocyanines.

According to the invention an alkali metal phthalocyanine is treated with methyl alcohol and afterwards with water.

The term alkali metal phthalocyanine is, as will be seen, a genus term and is intended to include compounds made as described in British Specification No. 410,814 (see also Barrett, Dent and Linstead, Journal of the Chemical Society, 1936, page 1728) from arylene dicyanides of the benzene or naphthalene series.

The methyl alcohol is used in the liquid form, and may be hot or cold. Preferably it is used cold, and indeed a temperature of 20° C. down to 0° C. is advisable, as then the eventual pigment is brighter in shade.

Mixtures in which the preponderating ingredients is methyl alcohol may also be used. For instance, equal parts by volume of methyl alcohol and water, or equal parts by volume of methyl alcohol and ethyl alcohol.

About 4 parts of methyl alcohol or mixture containing methyl alcohol for 1 part of alkali metal phthalocyanine is used. The proportion is not of great consequence except from a mechanical point of view; enough is used to give a thin slurry and eventually a paste that is still mobile.

The process of the invention is based on the surprising discovery that the action is peculiar to methyl alcohol. Alkali-metal phthalocyanines, when obtained as described above, have a coarse crystalline structure, visible to the naked eye. When they are treated with methyl alcohol according to the invention, the metal free phthalocyanines eventually obtained are very finely divided, having particles of average linear dimensions of about 20 microns, and these particles include aggregates, the primary particles having dimensions of from 1 micron long by 0.3 micron broad up to 18 microns long by 3 microns broad. In carrying the invention into practical effect it is seen that the originally thin slurry of alkali metal phthalocyanine in a suitable amount of methyl alcohol thickens up and becomes pasty. When water is added, a suspension of finely divided solid is obtained.

Another surprising effect is that the resulting product is much improved over a product similarly obtained by precipitation from sulphuric acid, both as regards tinctorial strength and as regards softness. These two are very important properties from the practical viewpoint. Improved tinctorial strength obviously means that less of the color is required to color a given area to a definite strength, or that a wider area can be colored by a given weight of the material. Softness affects the working of the pigment when it is desired to incorporate the same into other media for making inks, varnishes or lacquers. The products of this invention have proven themselves considerably softer than those obtained by acid pasting (i. e. precipitation from sulfuric acid) and will develop their full tinctorial strength, when made into a paste with a drying oil and extender, with much less working in the ink mill. The result is economy of both time and energy to the ink maker in the practical use of these pigments.

The invention is illustrated but not limited by the following examples in which the parts are by weight.

Example 1

10 parts of sodium phthalocyanine are made as described in Example 6 of British Specification No. 410,814 except that the amyl alcohol (see page 4, line 94 of Specification No. 410,814) is filtered off and not distilled off. The crystalline material is stirred into 50 parts of cold methyl alcohol. After a short time the easily fluid mixture begins to become thick and soon stiff. It becomes bluer in colour. The thick mixture is allowed to stand for about ½ hour and then 200 parts of boiling water are added. The slurry is filtered. The residue is washed with hot water until it is free from alkali. The paste is then dried at 100° C. A finely divided greenish blue powder is obtained, the particles in which have the size described above. This finely divided powder is suitable for use as a pigment.

Example 2

10 parts of potassium phthalocyanine (cf. Example 8 of British Specification No. 410,814, first four lines; the mixture is filtered when cool) are treated with 50 parts of methyl alcohol and afterwards as in Example 1, with similar results.

Example 3

10 parts of sodium phthalocyanine are stirred into a mixture of 25 parts of methyl alcohol and 25 parts water. The mixture thickens. After some time it is filtered. The residue is washed with hot water till free from alkali. It is then dried. Metal-free phthalocyanine like that of Example 1 is obtained.

As for the process of forming the alkali-metal phthalocyanine itself, the conditions therefor may vary within the same latitudes as indicated in said British Patent No. 410,814. An alcohol is chosen as liquid medium for the reaction, for the reason that sodium and potassium are soluble in alcohols. Amyl alcohol, isoamyl alcohol, and cyclohexanol have been indicated as the preferred alcohols, because they are high boiling. Any alcohol boiling within the range of 130° C. to 220° C. may be employed in lieu of those specified.

I claim:

1. In the process of producing metal-free phthalocyanine, the steps which comprise suspending an alkali-metal phthalocyanine in sufficient methyl alcohol to form a thin slurry, allowing the mass to stand until its consistency has thickened, diluting the mass with hot water, filtering, and washing the filter cake with water until free of alkali.

2. In the process of producing metal-free phthalocyanine, the steps which comprise suspending an alkali-metal phthalocyanine in from 2 to 10 times its weight of methyl alcohol, allowing the mixture to stand until perceptible change of state is complete, diluting the reaction mass with water, filtering and washing the pigment free of alkali.

3. The process of producing metal-free phthalocyanine, which comprises reacting phthalonitrile with an alkali-metal in a medium consisting of a high boiling alcohol, filtering off the high boiling alcohol, suspending the residual pigment in a liquid medium consisting predominantly of methyl alcohol, then diluting the mass with water, and recovering the resulting pigment.

4. The process of producing metal-free phthalocyanine, which comprises reacting phthalonitrile with metallic sodium in a medium consisting of a high boiling alcohol, filtering off the high boiling alcohol, suspending the residual pigment in methyl alcohol, then diluting the mass with water, and recovering the resulting pigment.

CHARLES ENRIQUE DENT.